United States Patent Office 2,800,424
Patented July 23, 1957

2,800,424
SYSTEMIC INSECTICIDES

Hamilton L. J. Marshall, Mobile, Ala., assignor to International X-ray, Inc., Mobile, Ala., a corporation of Alabama No Drawing. Application January 27, 1953,
Serial No. 333,604

2 Claims. (Cl. 167—35)

This invention relates to systemic insecticides for use, for example, admixed with fertilizers and both applied, as a mixture, to the soil adjacent growing vegetation. The soluble ingredients of the insecticides are thereupon taken up by the growing vegetation and poison biting, sucking and chewing insects feeding upon the tissues and liquid portions of the vegetation. In some cases it also poisons eggs laid by insects and deposited in the tissues of the vegetation, as well as fungus feeding upon the tissues or liquids of the vegetation.

In the compounding and use of a systemic insecticide it is important that the soluble ingredients of the systemic insecticide be taken up by the vegetation over a desirable period of time, such as the feeding or/and egg-laying period or periods, and that the ingredients be made available over a period of time, rather than substantially all at once, which latter might tend to cause a concentration of available insecticidal ingredients so great that it would detrimentally affect the vegetation, or prevent or hinder the vegetation from making use of fertilizer within the feeding area of the vegetation. A further problem resides in the need to prevent any undesirable chemical reactions between ingredients of a systemic insecticide during mixing, packaging, the period it is being stored preparatory to use, and the interval in which it is applied to and mixed with the soil.

Since some vegetation upon providing, for example, a seed crop, is subsequently employed as a feed or food, either green or dried, it is important that, if a systemic insecticide is employed, there be no undesirable insecticidal residue carried by the vegetation when employed as feed, a food, or the like.

If an ingredient of the systemic insecticide has fertilizing qualities made available during the period the insecticide is being slowly absorbed by the vegetation, such dual-function ingredient is particularly valuable.

An important object of this invention is to provide a systemic insecticide, the soluble portions of which will be taken up by vegetation over periods sufficient to cause poisoning of insects during substantially the entire period of feeding upon the vegetation and, if desirable, during the egg-laying period.

A further important object is to provide a systemic insecticide which, when introduced into the soil adjacent vegetation will be made available slowly for being taken up by the vegetation, whereby the vegetation will not be injured by the insecticide.

Another important object is to provide a systemic insecticide which may be safely mixed with fertilizer and will not render the vegetation non-receptive to the fertilizer nor lock the fertilizer in the soil against use by the vegetation.

In addition, an important object of the invention is to provide a systemic insecticide the ingredients of which will not react so as to form any appreciable volumes or amounts of dangerous or undesirable compounds during mixing, storage and application of the insecticide.

Also, an important object is to provide a systemic insecticide which will be practically spent, insecticidally, within the tissues of the vegetation so that it will have no undesirable effects when the vegetation is consumed as feed or food.

A further very important object of the invention is to provide in a systemic insecticide, a dual-function ingredient which is useful in the insecticide as such and also adds fertilizing qualities to the insecticide.

Other objects and advantages of the invention will be apparent during the course of the following detailed description of the invention.

Broadly, the systemic insecticide, which has, also, some fertilizing qualities and is adapted for admixture with conventional fertilizers, comprises a water soluble inorganic cyanide-containing compound or compounds, a buffer, a compound readily subjected to acid hydrolysis and a nitrogen-containing compound or compounds.

The water-soluble inorganic cyanide-containing compound or compounds may be one or more of the following: sodium cyanide, potassium cyanide and barium ferricyanide. However, I prefer to employ sodium cyanide. An extremely minute quantity of a cyanide-containing solution is sufficient to kill biting, chewing and sucking insects immediately upon taking the solution into their bodies. However, the cyanide-containing compounds are generally also destructive to plant tissues, and in order to employ them in the insecticide I have perfected, I prefer to mix therewith a water soluble agent which will prevent this destruction. I have discovered that copper sulphate ($CuSO_4$) possesses this quality, as does hypophosphorous acid ($H_3PO_2$) and other soluble acids of phosphorous as well as does ammonium chloride ($NH_4Cl$) and they may be employed, but I prefer to use commercial copper sulphate because of its well known fungicidal qualities and lesser cost.

However, in using the agent, which is particularly subject to acid hydrolysis in the presence of soil moisture, as the copper sulphate, the liability of the free sulfuric acid in the commercial product, and in the chemical fertilizer I may employ, to re-act upon the cyanide-containing compound, with the liberation of a certain amount of cyanogen (a gas), must be considered since the reaction will reduce the poisonous qualities of the cyanide. In order to prevent this I prefer to use a buffer such as lead acetate ($Pb(C_2H_3O_2)_2.3H_2O$). This compound is water soluble and has the added quality of being poisonous to sucking and biting insects. In the place of lead acetate I may employ other acetates such as sodium acetate ($NaC_2H_3O_2.3H_2O$) or potassium acetate ($KC_2H_3O_2$). Potassium carbonate ($K_2CO_3$) or potassium bicarbonate ($KHCO_3$) would also serve the purpose. While lead is known to have detrimental effects on plants if employed in excess, the parts by weight of the lead-containing compound employed, as compared with the other ingredients of the systemic insecticide, and with the systemic insecticide applied as directed, are not sufficient to cause any detrimental effects on the normal growth of plants.

The nitrogen-containing compounds are such as will break down and, in the presence of the copper sulphate or its chemical equivalent, liberate free ammonia. These compounds may be urea, anhydrous ammonia, ammonium hydroxide and ammonium nitrate. I prefer urea.

Referring again to the use of copper sulphate, it will undergo acid hydrolysis and the cupric ion will be instrumental in the formation of ammonia, acetate complexes and complex cyanides in the presence of the cyanides, lead acetate and urea mentioned.

In the case of the cyanide ingredient of the systemic insecticide buffered by the acetate there is effected basic hydrolysis as follows:

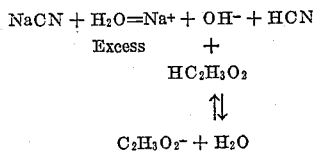

In the presence of the copper sulphate, for example, there will be a biuret reaction probably as follows:

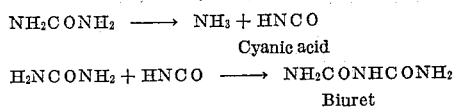

Of course, it is appreciated that the hydrogen cyanide (HCN) produced as a result of hydrolysis is suppressed by the high concentration of acetate ions, whereby what is formed will be retained in the soil by formation of the insoluble cupric cyanide, but this cyanide will be made available because of its solubility in the presence of ammonium hydroxide, which is formed gradually by action of free ammonia and soil water, and also its solubility in the presence of excess alkali cyanide.

As a result, the nitrogen-fixing bacteria of the soil will produce fixed nitrogen.

I am aware that urea has been employed in the fungicide industry as a stabilizing agent for various insoluble fungicides. But my systemic insecticide is, of course, soluble in water (soil water). The functions of the urea, in addition to ammonium ion disassociation by acid and/or basic hydrolysis, are to unite with the cyanides named and the complex cyanides formed and retard rapid oxidation of the cyanide solution in the soil and within the circulatory system of the vegetable growths so that the insecticidal qualities of the systemic insecticide will be available over a longer period yet, eventually, the break down of the cyanide residue will render the vegetable growth substantially non toxic to animals which may consume the growth or any part of it.

In the preparation of the systemic insecticide I prefer to thoroughly mix the several ingredients in the following ranges of parts by weight.

| | |
|---|---|
| Compound of cyanogen series | 1.7–3.7 |
| Buffer compound | 2.5–5.5 |
| CuSO4.5H2O (or equivalent) | 8.5–18.5 |
| Nitrogen-containing compound (which will break down and liberate NH3 in the presence of CuSO4.5H2O or its chemical equivalent) | 17.0–27.0 |

These ranges are critical. However, I prefer the following:

| | |
|---|---|
| Compound of cyanogen series | 2 |
| Buffer compound | 3 |
| CuSO4.H2O (or equivalent) | 10 |
| Nitrogen-containing compound (which will break down and liberate NH3 in the presence of CuSO4.5H2O or its chemical equivalent) | 20 |

A preferred formula is:

| | |
|---|---|
| NaCN | 2 |
| Pb(C2H3O2)2 hydrate | 3 |
| CuSO4.5H2O | 10 |
| NH2CONH2 | 20 |

The systemic insecticide may be packaged for subsequent addition to a filler for distribution to the soil. As a filler I prefer to suggest a commercial fertilizer, with the systemic insecticide substantially evenly distributed therethrough.

More specific examples of what compounds constitute the commercial fertilizer I may employ are first, compounds containing quickly available nitrogen such as ammonium sulphate, potassium nitrate and ammonium nitrate. Second, compounds containing quickly available potassium as potassium sulphate, potassium nitrate, potassium chloride and potassium phosphate and third, compounds containing phosphorus as potassium phosphate and monobasic calcium phosphate. Commercial fertilizer contains one or more of these compounds but it is generally well known that certain crops as, for instance, forage crops require particularly nitrogen fertilizer while other crops require more phosphate or potash rather than the other. Also some soils may be deficient in only one or two of these and so in the use of the term commercial fertilizer I do not limit myself to a mixture of nitrogen, potassium and phosphorous-containing compounds but may employ but one of them, or a mixture of any two of them, or a mixture of more than one nitrogen-containing compound, of more than one potassium-containing compound or more than one phosphorus-containing compound, or mixtures of two or three of these mixtures.

To substantially 100 pounds of commercial fertilizer I prefer to add substantially 35 parts by weight of the systemic insecticide. However, the addition of the insecticide may be lower, as for example, 10 parts by weight to 100 parts by weight of fertilizer.

Of course, the systemic insecticides may be marketed already thoroughly mixed with the fertilizer, if preferred.

The combined insecticide and fertilizer may be applied as required, for instance in the case of cotton for the growth of the cotton and the destruction of boll weevils and other biting, chewing and sucking insects, at the time of planting, or as a side dressing, at from four to six weeks after planting or just before the formation of the block squares.

The insecticide will go into solution in the soil and may be taken up by the plant, killing biting, chewing and sucking insects, attacking the roots or above ground portions of the growing plants.

Having thus described certain embodiments of the invention what is claimed is:

1. A water-soluble systemic insecticide for introduction to water-containing soil for slow absorption by the feeding roots of vegetation growing in said soil, said insecticide comprising from 1.7 to 3.7 parts by weight of a water-soluble inorganic cyanide; from 8.5 to 18.5 parts by weight of copper sulphate; from 17.0 to 27.0 parts by weight of urea; and from 2.5 to 5.5 parts by weight of an acetate of the group consisting of lead acetate, sodium acetate and potassium acetate.

2. A water-soluble systemic insecticide for introduction to water-containing soil for slow absorption by the feeding roots of vegetation growing in said soil, said insecticide comprising substantially two parts by weight of a water-soluble inorganic cyanide; substantially ten parts by weight of copper sulphate; substantially twenty parts by weight urea; and substantially three parts by weight of an acetate of the group consisting of lead acetate; sodium acetate and potassium acetate.

References Cited in the file of this patent

UNITED STATES PATENTS

| | | |
|---|---|---|
| 1,704,607 | Houghton | Mar. 5, 1929 |
| 1,818,136 | Houghton | Aug. 11, 1931 |
| 1,880,516 | Stauf | Oct. 4, 1932 |